United States Patent
Lin et al.

(10) Patent No.: US 7,356,323 B2
(45) Date of Patent: Apr. 8, 2008

(54) ANTENNA SELECTION FOR DIVERSITY COMBINING

(75) Inventors: Xintian E. Lin, Palo Alto, CA (US); Qinghua Li, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 425 days.

(21) Appl. No.: 10/734,198

(22) Filed: Dec. 15, 2003

(65) Prior Publication Data

US 2005/0130612 A1    Jun. 16, 2005

(51) Int. Cl.
    *H04B 1/06*    (2006.01)
(52) U.S. Cl. ...................... 455/277.2; 455/78
(58) Field of Classification Search ........... 455/137, 455/138, 140
    See application file for complete search history.

(56) References Cited

U.S. PATENT DOCUMENTS

| | | | |
|---|---|---|---|
| 5,757,318 A | * | 5/1998 | Reudink ............ 342/374 |
| 6,243,563 B1 | * | 6/2001 | Nakamura ............ 455/78 |
| 6,408,169 B1 | * | 6/2002 | Pallonen ............ 455/277.2 |
| 6,987,956 B2 | * | 1/2006 | Yoon ............ 455/133 |
| 6,987,958 B1 | * | 1/2006 | Lo et al. ............ 455/269 |
| 2003/0003937 A1 | * | 1/2003 | Ohkubo et al. ............ 455/517 |
| 2003/0083016 A1 | | 5/2003 | Evans et al. |
| 2003/0104796 A1 | | 6/2003 | Yoon |
| 2003/0166394 A1 | * | 9/2003 | Tsien et al. ............ 455/67.1 |

FOREIGN PATENT DOCUMENTS

| | | |
|---|---|---|
| JP | 56158541 | 7/1981 |
| JP | 61072421 | 4/1986 |

* cited by examiner

*Primary Examiner*—Edward F. Urban
*Assistant Examiner*—Adeel Haroon
(74) *Attorney, Agent, or Firm*—Venable, LLP; James R. Burdett

(57) ABSTRACT

A diversity combining receiver may employ a switching architecture that permits multiple receiver chains to be coupled to multiple antennas.

23 Claims, 9 Drawing Sheets

ANTENNA SELECTION FOR DIVERSITY COMBINING

BACKGROUND OF THE INVENTION

Many wireless communication systems may use more than one antenna for diversity. In such cases, the receiver apparatus may choose to process the output of one antenna (for example, it may choose to process the "best" signal out of any of the antennas; criteria for choosing a "best" signal may include, but are not limited to, signal-to-noise ratio, received signal strength, noise level, etc.). Alternatively, if there are multiple receiver chains in the receiver apparatus, each of the multiple receiver chains may process the output of a particular antenna. The outputs of these receiver chains may then be combined according to some analog or digital combining method, which may result in improved reception.

Some receive apparatuses may include more antennas than receiver chains. In such a case, it is necessary to choose to which antennas the receiver chains should be coupled for processing the signals from the antennas.

BRIEF DESCRIPTION OF THE DRAWINGS

Preferred embodiments of the invention will now be described in connection with the associated drawings, in which.

DETAILED DESCRIPTION OF PREFERRED EMBODIMENTS

Figure 1:
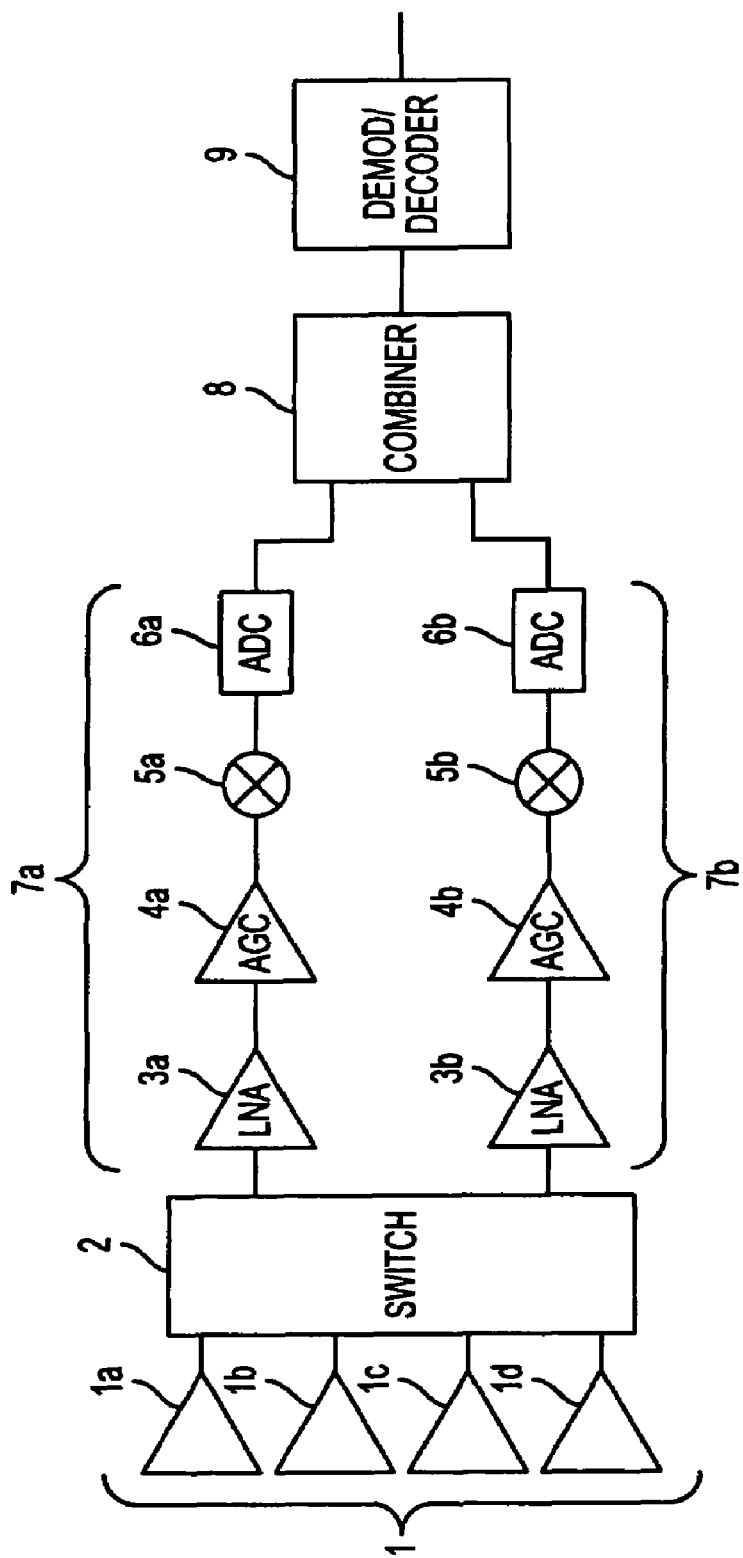
FIG. 1 depicts a conceptual block diagram of a system implementing a first exemplary embodiment of the invention.

In the following description, numerous specific details are set forth. However, it is understood that embodiments of the invention may be practiced without these specific details. In other instances, well-known circuits, structures, and/or techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

FIG. 1 depicts a conceptual block diagram including an exemplary implementation of an embodiment of the invention. A receiver system according to an embodiment of the invention may include multiple antennas 1 (1a, 1b, 1c, 1d) connected to a switch 2. Switch 2 is also connected to two or more receiver chains, two of which, 7a and 7b, are shown in the figure. A receiver chain, for example, 7a, may comprise one or more of a low noise amplifier (LNA) 3a, automatic gain control (AGC) 4a, a mixer 5a, and an analog-to-digital converter (ADC) 6a. Each of receiver chains 7a and 7b may be connected to a combiner 8 adapted to combine the outputs of receiver chains 7a and 7b according to a diversity combining method. One example of such a diversity combining method, to which the invention is not limited, is maximal ratio combining. Following diversity combining 8, normal demodulation and/or decoding 9 may be performed on the resulting (combined) signal. By using switch 2, two signals, which may be selected according to some predetermined criterion or criteria (examples of which may be, but are not limited to, signal-to-noise ratio, received signal strength, and noise level), may be selected for processing in receiver chains 7a and 7b.

In FIG. 1, combiner 8 is shown connected following ADCs 6a and 6b. However, in an alternative embodiment, combiner 8 may be connected to analog signals (i.e., prior to ADCs 6a and 6b), and a single ADC may be used, after combining, to convert the analog signal to a digital signal. Alternatively, if demodulator/decoder 9 is designed to be capable of handling analog signals, it may be possible to omit ADCs altogether.

Figure 2:
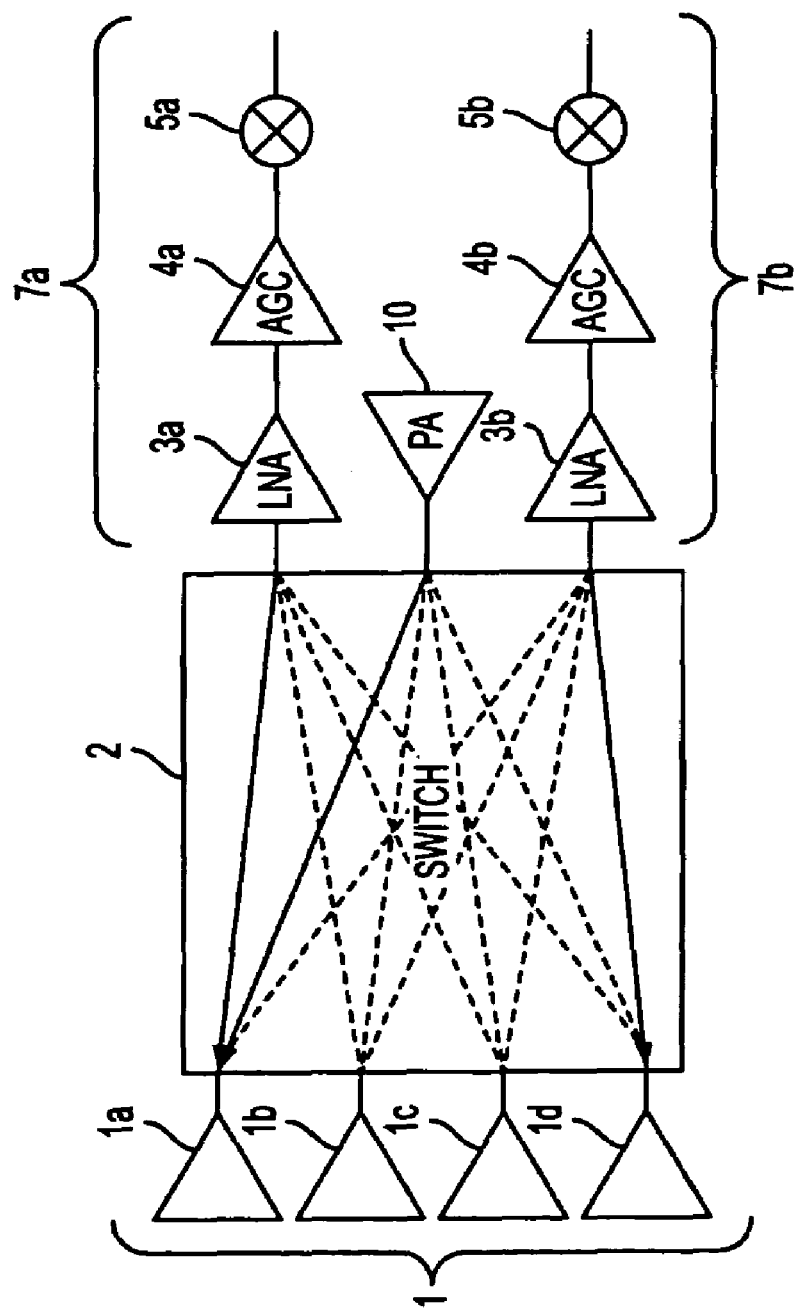
FIG. 2 depicts a conceptual block diagram of a system implementing a second exemplary embodiment of the invention.

A further embodiment of the invention is shown in FIG. 2, which includes a first embodiment of switch 2. In this embodiment, switch 2 may comprise two 4×1 sub-switches, each adapted to couple one of the receiver chains 7a, 7b to any one of the antennas 1. In a more general setting, in which there are K antennas and N receiver chains, this would be equivalent to using N K×1 sub-switches. In this arrangement, any receiver chain 7a, 7b may be connected to any one of the antennas 1.

The embodiment of FIG. 2 may further include a power amplifier 10, typically used for transmission. To accommodate transmission, the switch 2 may further include a 4×1 sub-switch adapted to couple the output of power amplifier 10 to any one of the four antennas 1. Such an arrangement may be useful, for example, if switch 2 is included as part of a transceiver.

Figure 3:
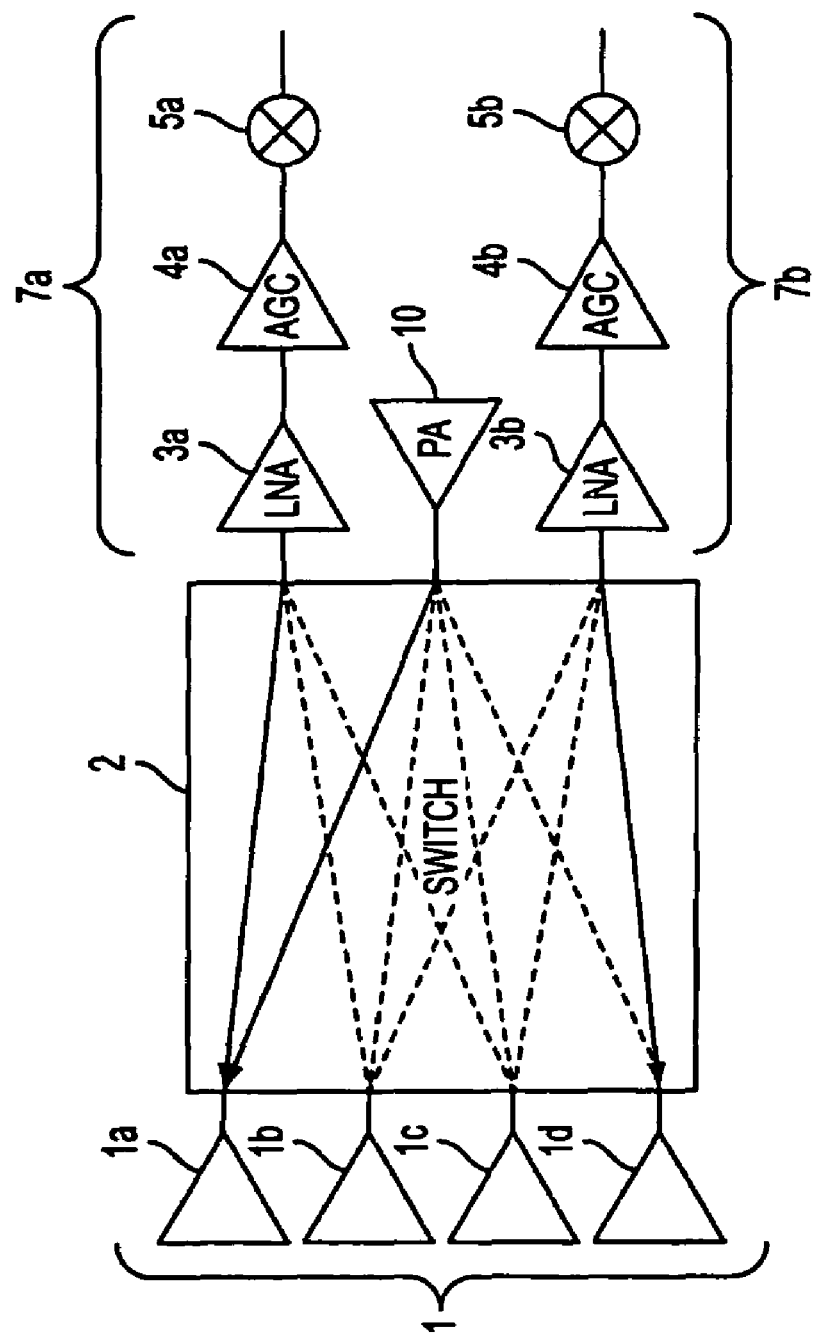
FIG. 3 depicts a conceptual block diagram of a system implementing a third exemplary embodiment of the invention.

FIG. 3 shows a further embodiment of the invention. In this embodiment, switch 2 may comprise two 3×1 sub-switches, each adapted to switch three of the four antenna outputs to one of the receiver chains 7a, 7b. For example, as shown in FIG. 3, one 3×1 switch may be adapted to couple one of antennas 1a, 1b, and 1c to receiver chain 7a, and the other 3×1 sub-switch may be adapted to couple one of antennas 1b, 1c, and 1d to receiver chain 7b. Note that this is merely an exemplary arrangement, and the invention is not to be understood as being limited to this arrangement. Switch 2 may further include a 4×1 sub-switch, as in the previous embodiment, adapted to couple the output of power amplifier 10 to one of the four antennas 1.

In the embodiment of FIG. 3, although each receiver chain 7a, 7b may not be capable of being coupled to every antenna 1, the switching arrangement is such that each receiver chain 7a, 7b may be coupled to a different one of the antennas 1 in such a way that all combinations of two of the four antennas 1 may be received.

The embodiment of FIG. 3 may be generalized to the case of K antennas and N receiver chains. In that case, switch 2 may comprise N (K−N+1)×1 sub-switches, each coupled to one of the N receiver chains and adapted to couple a particular receiver chain with one of K−N+1 of the K antennas.

Figure 4:
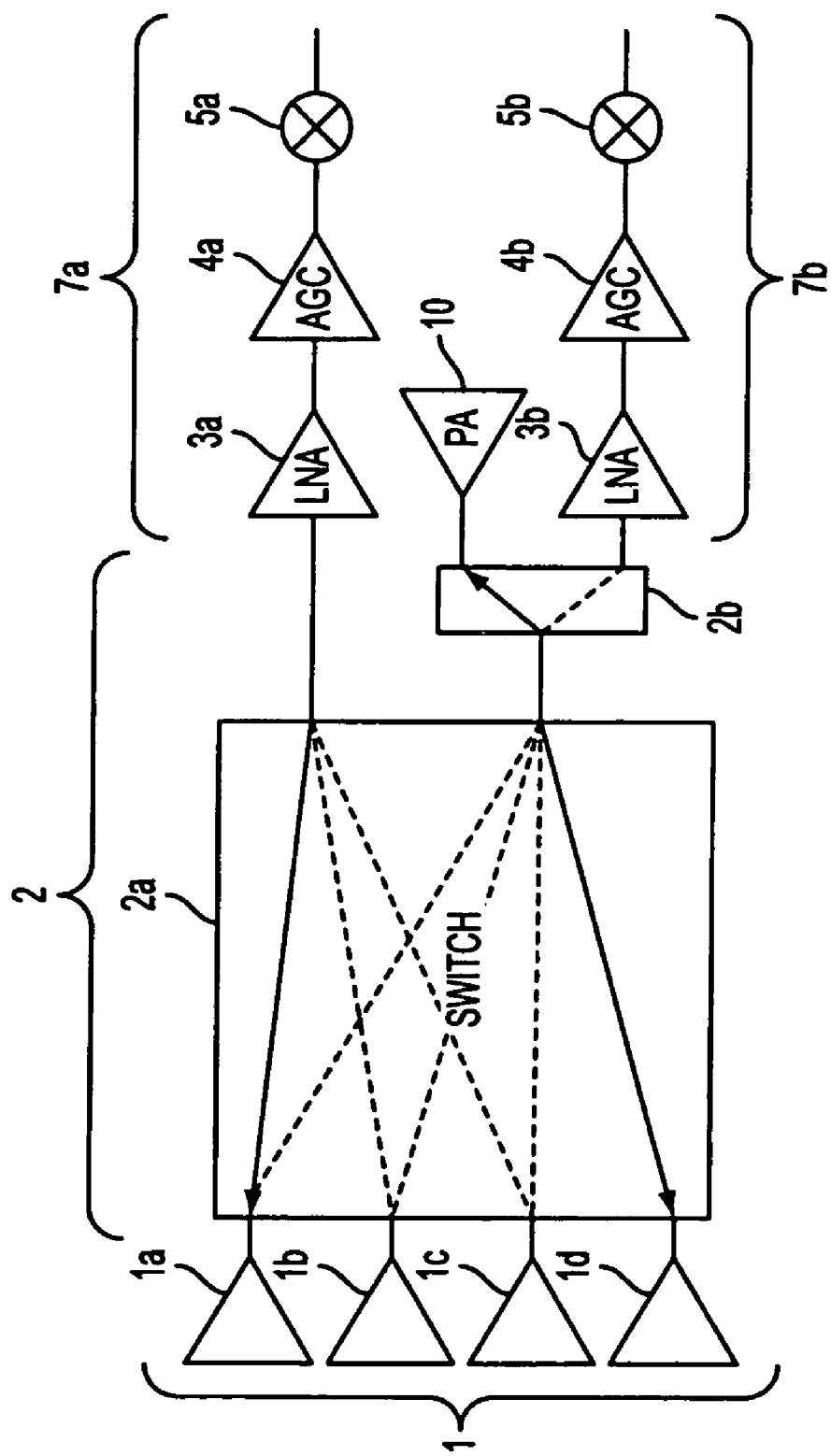
FIG. 4 depicts a conceptual block diagram of a system implementing a fourth exemplary embodiment of the invention.

FIG. 4 shows a further embodiment of the invention. In this embodiment, switch 2 may comprise a cascaded switching arrangement, which may comprise switches 2a and 2b. Switch 2a may comprise a 3×1 sub-switch and a 4×1 sub-switch, while switch 2b may comprise a 2×1 switch that may be coupled to the 4×1 sub-switch. In this arrangement, switch 2b may be coupled to power amplifier 10 and a receiver chain 7b. Switch 2b may be adapted to couple one of power amplifier 10 and receiver chain 7b to the 4×1 sub-switch of switch 2a. The 4×1 sub-switch of switch 2a may, in turn, be adapted to couple either power amplifier 10 or receiver chain 7b (whichever is coupled to the 4×1 sub-switch by 2×1 switch 2b) to one of the four antennas 1. The 3×1 sub-switch of switch 2a may be adapted to couple receiver chain 7a to one of three of the four antennas, for example, but not limited to, antennas 1a, 1b, and 1c. As in the embodiment of FIG. 3, although each receiver chain 7a, 7b in the embodiment of FIG. 4 may not be capable of being coupled to every antenna 1, the switching arrangement is such that each receiver chain 7a, 7b may be coupled to a different one of the antennas 1 in such a way that all combinations of two of the four antennas 1 may be received.

Note that the embodiment of FIG. 4 may be generalized for the case of K antennas and N receiver chains. In such a case, N−1 of the receiver chains may be coupled to one of K−1 of the K antennas via (N−1) (K−1)×1 sub-switches in switch 2a, while a power amplifier and an Nth receiver chain may be coupled to a 2×1 switch 2b coupled to a K×1 sub-switch in switch 2a.

The embodiment of FIG. 4 may allow for a simpler switching structure than the embodiments of FIGS. 2 and 3. On the other hand, use of a cascaded switch network may introduce an insertion loss. In general, however, such insertion loss may be rather small (for example, on the order of 0.4 dB for signals in the 0-6 GHz band).

Figure 5:
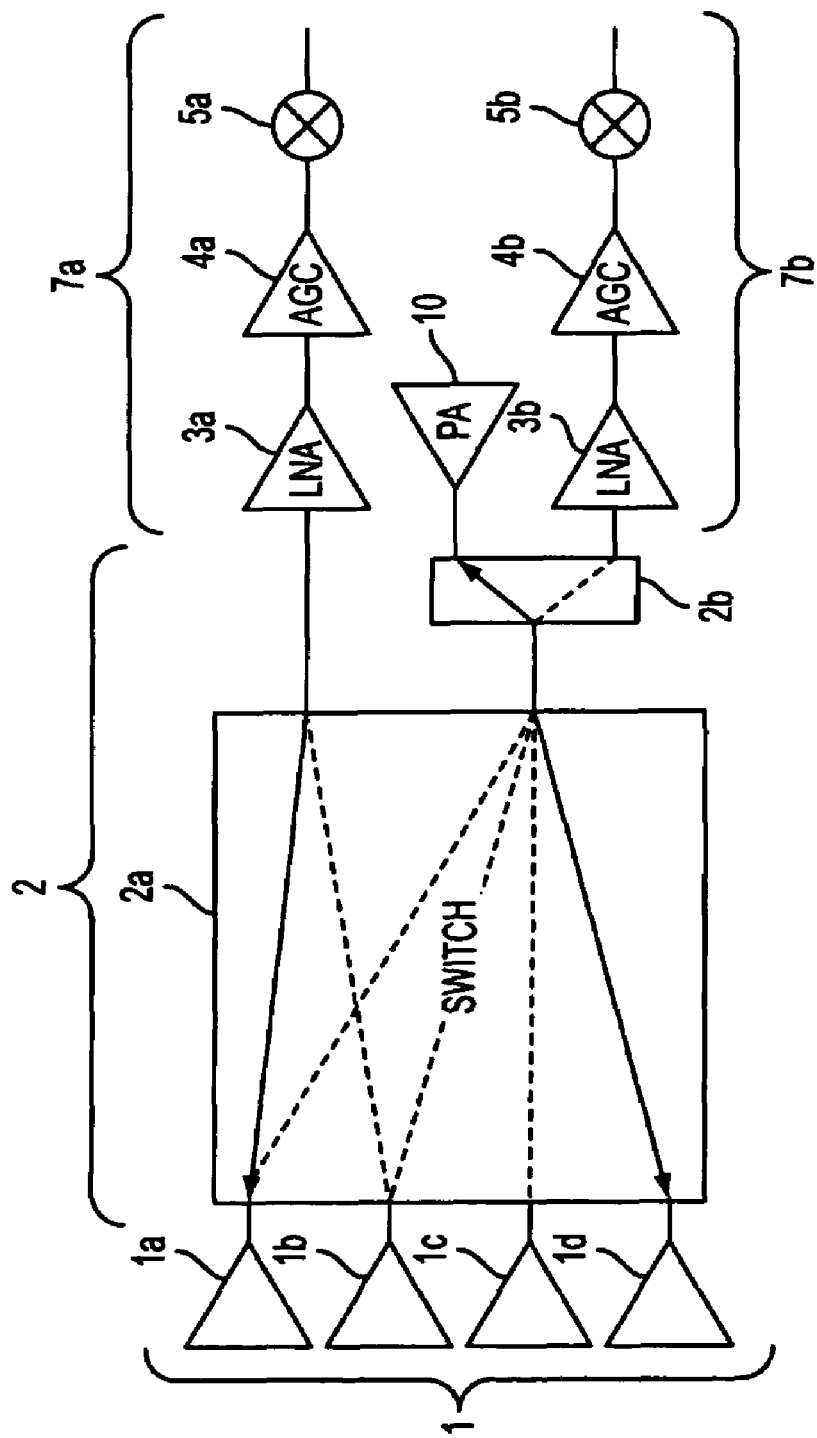
FIG. 5 depicts a conceptual block diagram of a system implementing a fifth exemplary embodiment of the invention.

FIG. 5 shows another embodiment of the invention that may employ cascaded switching. In this embodiment, a receiver chain 7b and power amplifier 10 may be, once again, coupled to switch 2a by a 2×1 switch 2b. In this embodiment, however, switch 2a may comprise a 4×1 sub-switch, which may be coupled to switch 2b, and a 2×1 sub-switch, which may be coupled to receiver chain 7a. In this fashion, either power amplifier 10 or receiver chain 7b may be coupled to any of the antennas 1. On the other hand, receiver chain 7a may only be coupled to one of two of the four antennas 1; in FIG. 5, these two antennas would be antennas 1a and 1b (however, this is merely an example, and the invention is not to be understood as being limited to this case). As a result, in the exemplary implementation shown in FIG. 5, all combinations of two antennas may be connected to receiver chains 7a and 7b except for one, the combination of antennas 1c and 1d. As a result, the switching arrangement of FIG. 5 may be simpler, but it may also be sub-optimal, as one possible combination of antennas may be impossible to achieve.

As in the previous embodiments, the embodiment of FIG. 5 may be generalized to the case of K antennas and N receiver chains, if desired. Furthermore, as discussed above in connection with the embodiment of FIG. 4, the use of cascaded switching may add an additional insertion loss.

Figure 6:
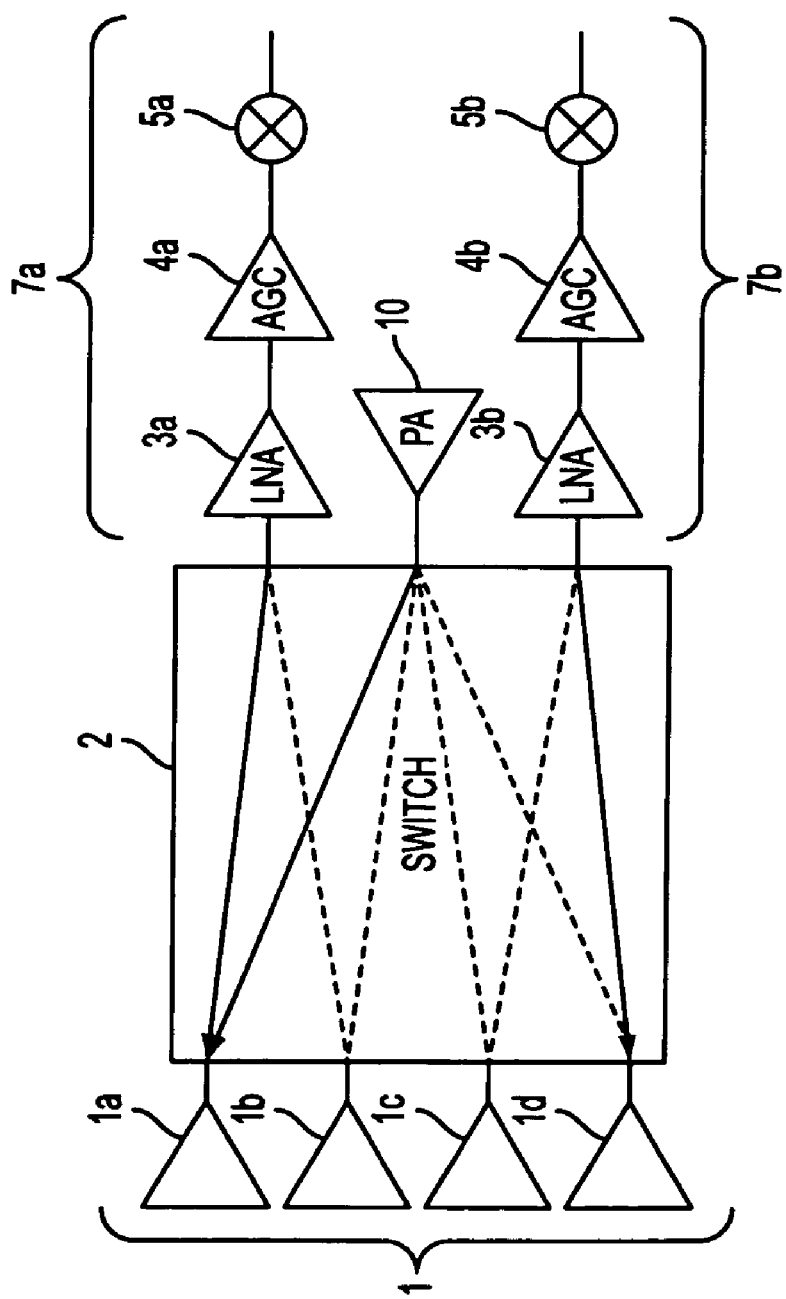
FIG. 6 depicts a conceptual block diagram of a system implementing a sixth exemplary embodiment of the invention.

FIG. 6 shows another embodiment of the invention, without cascaded switching. In this embodiment, switch 2 may have separate sub-switches for each receiver chain 7a, 7b and for power amplifier 10. In the illustrated embodiment, the switch connected to power amplifier 10 may be a 4×1 sub-switch, which may permit power amplifier 10 to be coupled to any of the four antennas 1. Each receiver chain 7a, 7b may be coupled to a 2×1 sub-switch in switch 2, which thus may permit each of the receiver chains 7a, 7b to be coupled to one of two of the four antennas 1. In FIG. 6, receiver chain 7a may be coupled to antenna 1a or antenna 1b, while receiver chain 7b may be coupled to antenna 1c or antenna 1d. Note that these couplings are exemplary, and the invention is not to be thus limited. In this example, therefore, receiver chains 7a, 7b may be coupled to the combinations of antennas {(1a, 1c), (1a, 1d), (1b, 1c), (1b, 1c)}, but they may not be coupled to the combinations {(1a, 1b), (1c, 1d)}. As a result, two possible combinations of antennas may not be possible to achieve.

Again, as in the previous embodiments, the embodiment of FIG. 6 may be generalized to K antennas and N receiver chains.

Figure 7:
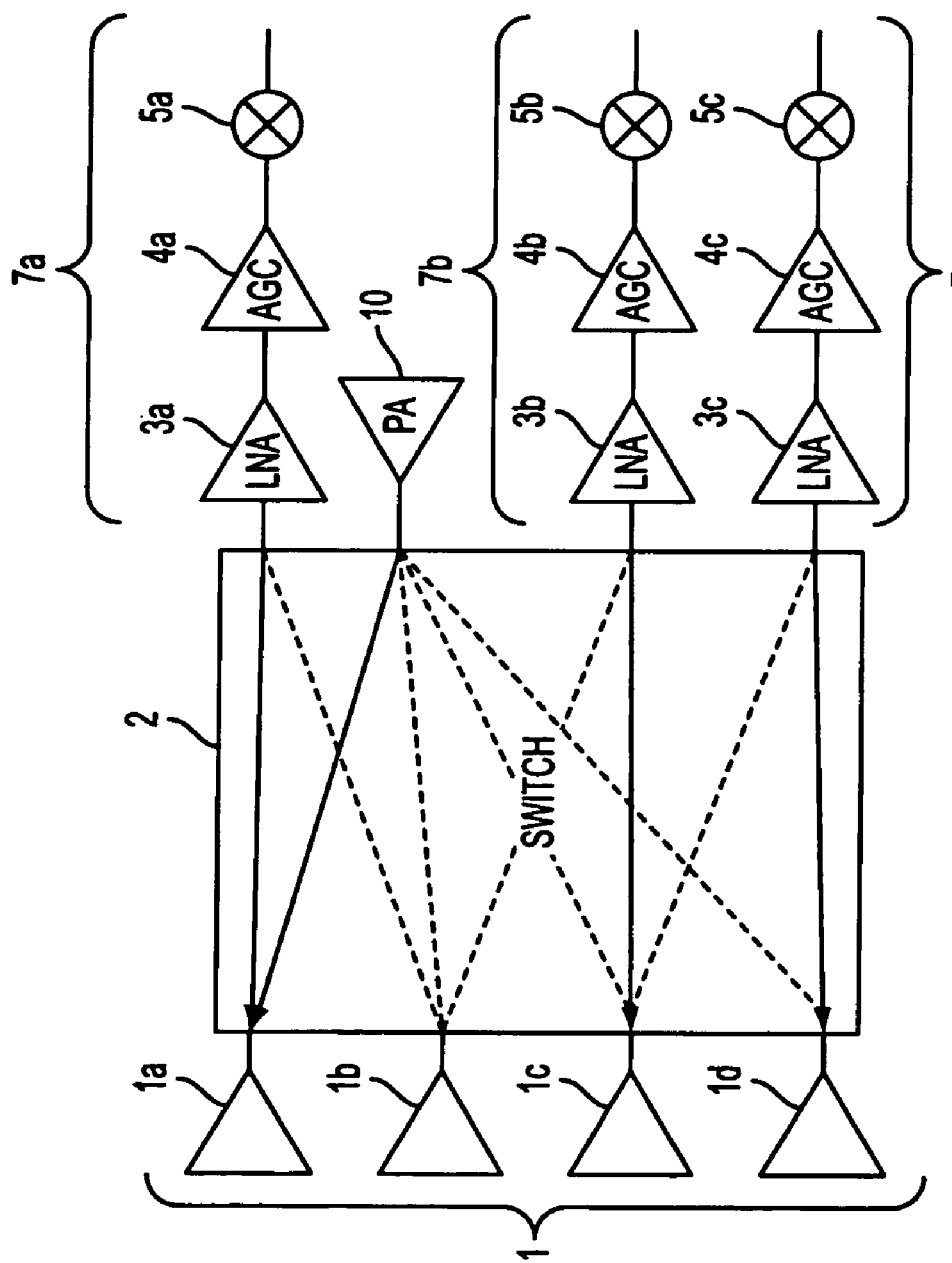
FIG. 7 depicts a conceptual block diagram of a system implementing a seventh exemplary embodiment of the invention.

FIG. 7 shows an exemplary implementation of a further embodiment of the invention in which there may be K antennas and K−1 receiver chains. As shown in the exemplary implementation of FIG. 7, there may be four antennas 1 and three receiver chains 7a, 7b, 7c. In this case, switch 2 may comprise three 2×1 sub-switches, each coupled to one of receiver chains 7a, 7b, 7c, and one 4×1 sub-switch, coupled to power amplifier 10. In such an arrangement, power amplifier 10 may be coupled to any of the four antennas 1, and each of the receiver chains 7a, 7b, 7c may be connected to two of the four antennas 1. Using this arrangement of switches, it may be possible to choose any three antennas out of the four antennas 1 for processing by the three receiver chains 7a, 7b, 7c.

When generalizing the embodiment of FIG. 7 for K antennas and K−1 receiver chains, switch 2 may comprise K−1 2×1 sub-switches, each of which may be coupled to one of the K−1 receiver chains.

The above embodiments may be used in either symmetric or asymmetric uplink-downlink combinations. Here, a symmetric combination is one in which both the uplink and the downlink employ the same diversity arrangement in their receivers, which, for example, may be as discussed in one of the above embodiments. An asymmetric combination is one in which the uplink and downlink receivers differ in their diversity arrangements. Because diversity may generally result in a processing gain, in an asymmetric channel, the diversity processing gain may exist in one direction and not in the other (or there may be different processing gains).

Figure 9:
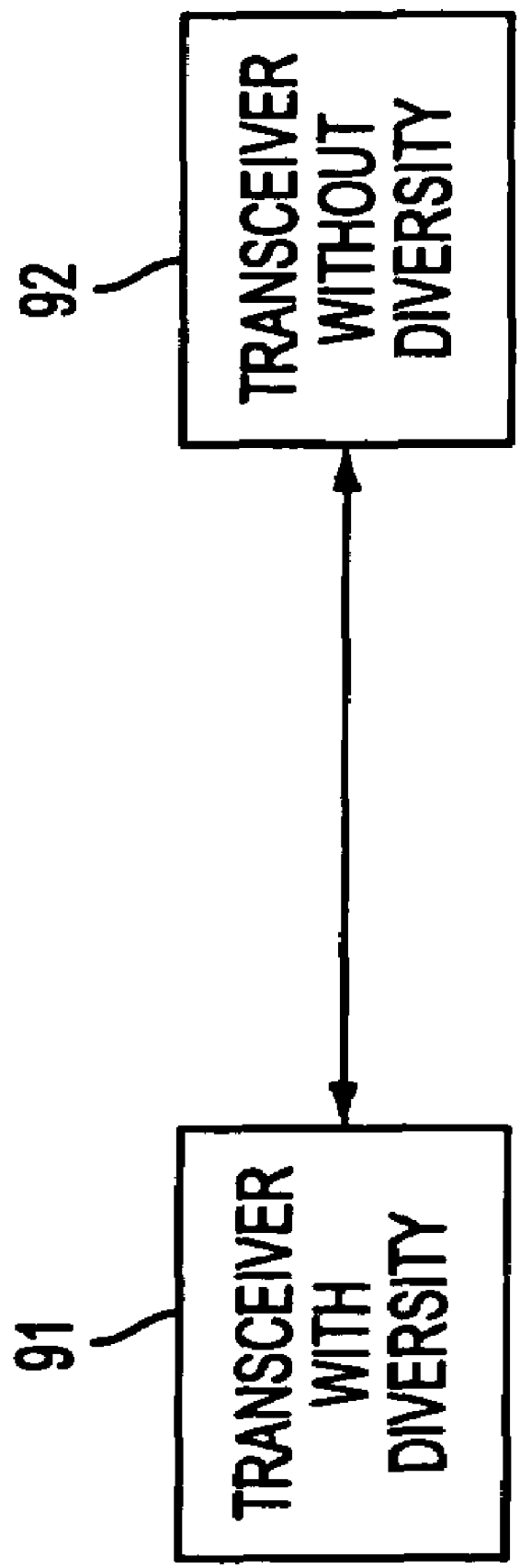
FIG. 9 depicts a conceptual block diagram of a system implementing a further embodiment of the invention.

As an example, as shown in FIG. 9, a channel may have a transceiver 91 at one end that may employ diversity resulting in a processing gain of, for example, 9 dB (in effective signal-to-noise ratio), while the transceiver 92 at the other end of the channel may employ no diversity. The transceiver 91 using diversity may use the knowledge of this processing gain difference to reduce its transmit data rate to compensate for its counterpart transceiver 92 that lacks the same processing gain. In other words, the transceiver with diversity 91 may reduce its data rate such that a necessary signal-to-noise ratio to support a desired symbol (or bit) error rate may be reduced by 9 dB (using the example above; this should not be understood as limiting the scope of the invention), corresponding to the lack of processing gain in the transceiver lacking diversity 92. The amount of such data rate back-off may be determined, for example, using well-known methods of computing error rates as functions of signal-to-noise ratios.

The above algorithm may also use information on, for example, number of antennas and/or transceiver chains, output power, and/or receiver sensitivity. Such information may, for example, be exchanged between transceivers when a communication link is established.

Figure 8:
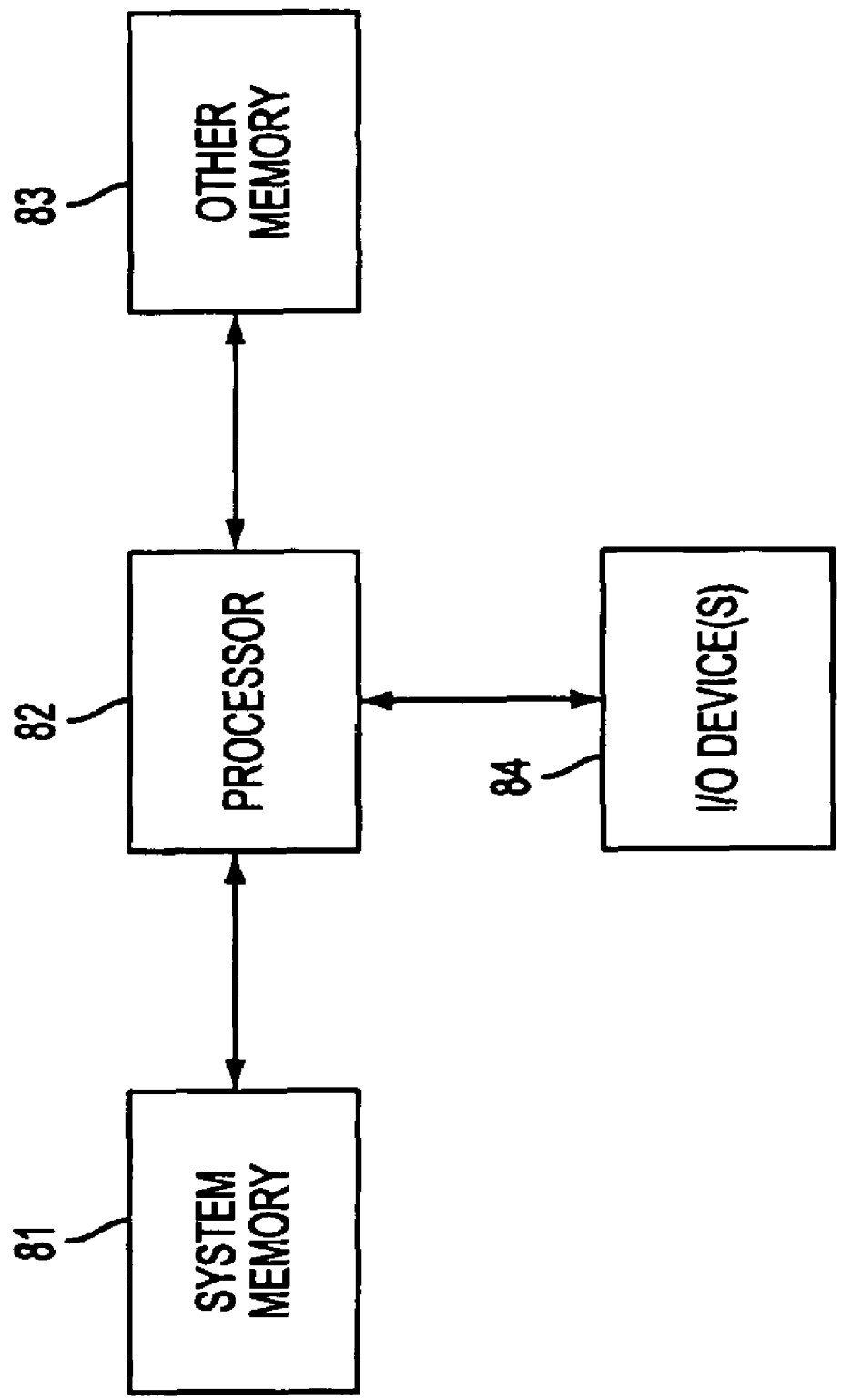
FIG. 8 depicts a conceptual block diagram of a further implementation of an embodiment of the invention.

Some embodiments of the invention, as discussed above, may be embodied in the form of software instructions on a machine-readable medium. Such an embodiment is illustrated in FIG. 8. The computer system of FIG. 8 may include at least one processor 82, with associated system memory 81, which may store, for example, operating system software and the like. The system may further include additional memory 83, which may, for example, include software instructions to perform various applications. The system may also include one or more input/output (I/O) devices 84, for example (but not limited to), keyboard, mouse, trackball, printer, display, network connection, etc. The present invention may be embodied as software instructions that may be stored in system memory 81 or in additional memory 83. Such software instructions may also be stored in removable or remote media (for example, but not limited to, compact disks, floppy disks, etc.), which may be read through an I/O device 84 (for example, but not limited to, a floppy disk drive). Furthermore, the software instructions may also be transmitted to the computer system via an I/O device 84, for example, a network connection; in such a case, a signal containing the software instructions may be considered to be a machine-readable medium.

Furthermore, the invention may be used in systems that include, but are not limited to, wireless local area networks (WLANs), cellular networks, personal communication networks, etc. The invention may be incorporated into transceivers, network interface cards (NICs), and the like, which are intended to be non-limiting examples.

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. An apparatus, comprising:
   first and second receiver chains and at least one transmitter chain, which is a dedicated transmitter chain different and separate from the first and second receiver chains;
   N multiple antennas to connect to the first and second receiver chains and the transmitter chain, N being greater than two;
   a switch adapted to couple each receiver chain to an individual reception antenna during reception and the transmitter chain to an individual transmission antenna during transmission so that each receiver chain is coupled to a different one of said antennas, said switch comprising:
   a first sub-switch adapted to couple a first reception antenna, selected from at least two antennas, to the first receiver chain,
   a second sub-switch adapted to couple a second reception antenna, selected from at least two antennas, to the second receiver chain, and
   a third sub-switch, operationally coupled in series with the first sub-switch, adapted to couple a transmission antenna, selected from N antennas, via the first sub-switch to the transmitter chain during transmission and the first reception antenna to the first receiver chain via the first sub-switch during reception; and a combiner operationally coupled to the selected individual reception antennas via the first and second receiver chains to combine signals from the selected individual reception antennas to form a combined output.

2. The apparatus according to claim 1, wherein each individual antenna to be coupled by said switch to each receiver chain is to be selected according to a predetermined criterion.

3. The apparatus according to claim 1, wherein the first sub-switch is adapted to be coupled to four antennas and the second sub-switch is adapted to be coupled to three antennas.

4. The apparatus according to claim 1, wherein the first sub-switch is adapted to be coupled to four antennas and the second sub-switch is adapted to be coupled to two antennas.

5. The apparatus according to claim 1, wherein, during reception, first and second signal paths are created, which first signal path includes only the first, and third sub-switches and the second signal path includes only the second sub-switch, and, during the transmission, a third signal path is created which third signal path includes only the first and third sub-switches.

6. The apparatus according to claim 1, wherein the second sub-switch is adapted to be coupled to N−1 antennas, wherein N is greater than three.

7. The apparatus according to claim 1, further including:
a third receiver chain being different and separate from the transmitter chain and wherein the switch includes a fourth sub-switch adapted to couple a third reception antenna, selected from at least two antennas, to the third receiver chain.

8. The apparatus according to claim 7, wherein the second and fourth sub-switch each is adapted to be coupled to two antennas.

9. A system comprising:
N antennas for connecting to at least R receiver chains and a transmitter chain, which is a dedicated transmitter chain different and separate from the receiver chains, R being less than N; and
a switch adapted to couple each of said receiver chains to a selected individual antenna so that each individual receiver chain is coupled to a different one of said antennas, said switch comprising:
a first sub-switch adapted to couple a first antenna selected from (N−T) antennas T being less than R, to (R−T) receiver chains,
a second sub-switch adapted to be coupled to N antennas, and
a third sub-switch operationally coupled in series with the second sub-switch to couple T antennas selected from N antennas to T receiver chains during reception and one antenna selected from N antennas to the transmitter chain during transmission.

10. The system according to claim 9, further comprising:
a combiner operationally coupled to selected individual antennas to receive signals from the selected individual antennas via said receiver chains and combine said signals into a combined signal.

11. The system according to claim 10, further comprising:
a demodulator/decoder adapted to receive said combined signal from said combiner and perform at least one of demodulation and decoding of said combined signal.

12. The system according to claim 9, wherein each individual antenna to be coupled by said switch to each of said receiver chains is to be selected according to a predetermined criterion.

13. The system according to claim 9, wherein each sub-switch is adapted to be coupled to at least two antennas.

14. The system according to claim 9, wherein the third sub-switch is adapted to be coupled to a transmitter chain such that said second sub-switch is coupled to a receiver chain or said transmitter chain through said third sub-switch.

15. The system according to claim 9, further comprising:
a second transceiver adapted to communicate with a first transceiver, said first transceiver comprising said antennas, said receiver chains, and said switch, and second transceiver lacking antenna diversity, wherein said first transceiver is adapted to transmit a signal to said second transceiver at a data rate that compensates for the second transceiver's lack of antenna diversity.

16. A method, comprising:
determining first and second subsets of antennas from N antennas, wherein the first subset includes more than and fewer than or equal to N antennas and the second subset includes more than one and fewer than N antennas;
coupling a first sub-switch to the first subset and a first receiver chain;
coupling a second sub-switch to the second sub-set and a second receiver chain;
selecting a first reception antenna in the first subset and a second reception antenna in the second subset using a predetermined criterion;
coupling a third sub-switch to N antennas and the transmission chain;
selecting a transmission antenna from N antennas using a predetermined criterion;
switching signals from the first selected reception antenna to the first receiver chain with the first sub-switch;
switching signals from the second selected reception antenna to the second receiver chain with the second sub-switch; and
switching signals from the selected transmission antenna to the transmitter chain with the third sub-switch, each individual receiver chain receiving a different one of said signals from said selected reception antenna, wherein each receiver chain may only receive signals from the determined subset of said plurality of antennas.

17. The method according to claim 16, further comprising:
combining signals processed by said receiver chains according to a diversity combining technique.

18. The method according to claim 16, wherein the first subset includes two antennas and the second subset includes four antennas.

19. The method according to claim 16, further comprising:
adjusting a data rate of a signal transmitted by said transmitter chain to compensate for a lack of diversity at a remote receiver.

20. A machine-readable medium that provides instructions, which when executed by a computing platform, cause said computing platform to perform operations comprising a method of:
determining first and second subsets of antennas from N antennas, wherein the first subset includes more than one and fewer than or equal to N antennas and the second subset includes more than one and fewer than N antennas;

coupling a first sub-switch to the first subset and a first receiver chain;

coupling a second sub-switch to the second sub-set and a second receiver chain;

selecting a first reception antenna in the first subset and a second reception antenna in the second subset using a predetermined criterion;

coupling a third sub-switch to N antennas and the transmission chain;

selecting a transmission antenna from N antennas using a predetermined criterion;

switching signals from the first selected reception antenna to the first receiver chain with the first sub-switch;

switching signals from the second selected reception antenna to the second receiver chain with the second sub-switch; and switching signals from the selected transmission antenna to the transmitter chain with the third sub-switch, each individual receiver chain receiving a different one of said signals from said selected reception antenna, wherein each receiver chain may only receive signals from the determined subset of said plurality of antennas.

21. The machine-readable medium according to claim 20, further comprising instructions, which when executed by a computing platform, cause said computing platform to perform operations further comprising:

combining signals processed by said receiver chains according to a diversity combining technique.

22. The machine-readable medium according to claim 20, wherein the first subset includes two antennas and the second subset includes four antennas.

23. The machine-readable medium according to claim 20, further comprising instructions, which when executed by a computing platform, cause said computing platform to perform operations further comprising:

adjusting a data rate of a signal transmitted using said transmitter chain to compensate for a lack of diversity at a remote receiver.

* * * * *